United States Patent
Suzuki et al.

(10) Patent No.: US 10,119,862 B2
(45) Date of Patent: Nov. 6, 2018

(54) SPECTRUM MEASURING DEVICE, SPECTROSCOPIC DEVICE, AND SPECTROSCOPIC SYSTEM

(71) Applicants: Shuichi Suzuki, Osaka (JP); Hidetaka Noguchi, Hyogo (JP); Masayuki Fujishima, Kanagawa (JP); Hidenori Kato, Hyogo (JP); Junichi Azumi, Miyagi (JP); Masashi Suematsu, Hyogo (JP)

(72) Inventors: Shuichi Suzuki, Osaka (JP); Hidetaka Noguchi, Hyogo (JP); Masayuki Fujishima, Kanagawa (JP); Hidenori Kato, Hyogo (JP); Junichi Azumi, Miyagi (JP); Masashi Suematsu, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/905,925

(22) Filed: Feb. 27, 2018

(65) Prior Publication Data
US 2018/0252578 A1 Sep. 6, 2018

(30) Foreign Application Priority Data

Mar. 1, 2017 (JP) ................................. 2017-038050

(51) Int. Cl.
*G01J 3/52* (2006.01)
*G01J 3/02* (2006.01)
(Continued)

(52) U.S. Cl.
CPC ................ *G01J 3/021* (2013.01); *G01J 3/06* (2013.01); *G01J 3/30* (2013.01); *G01J 3/18* (2013.01); *G01J 3/28* (2013.01); *G01J 3/52* (2013.01)

(58) Field of Classification Search
CPC ........ G01J 3/02; G01J 3/10; G01J 3/18; G01J 3/26; G01J 3/28
See application file for complete search history.

(56) References Cited

U.S. PATENT DOCUMENTS

2003/0025984 A1* 2/2003 Gudeman .......... G02B 26/0808
  359/291
2012/0170024 A1 7/2012 Azzazy et al.
2017/0350759 A1 12/2017 Azumi et al.

FOREIGN PATENT DOCUMENTS

| DE | 10 2008 019 600 A1 | 10/2009 |
|---|---|---|
| JP | 2011-257140 | 12/2011 |
| JP | 2017-219533 | 12/2017 |

OTHER PUBLICATIONS

Office Action dated Jul. 13, 2018, in the corresponding European Patent Application No. 18157454.2-1020.

* cited by examiner

*Primary Examiner* — Abdullahi Nur
(74) *Attorney, Agent, or Firm* — Oblon, McClelland, Maier & Neustadt, L.L.P.

(57) ABSTRACT

A spectrum measuring device including a ribbon element, a light detection element, and circuitry. The ribbon element includes a first light reflector including a plurality of first light reflection surfaces configured to be translated in an out-of-plane direction, and a second light reflector including a plurality of second light reflection surfaces that are fixed. The circuitry supplies a drive signal to the ribbon element in such a manner that a change of a displacement amount difference between the first light reflection surfaces and the second light reflection surfaces corresponds to a predetermined frequency; and acquires the light quantity data detected by the light detection element at a predetermined sampling frequency.

13 Claims, 14 Drawing Sheets

(51) Int. Cl.
*G01J 3/30* (2006.01)
*G01J 3/06* (2006.01)
G01J 3/28 (2006.01)
G01J 3/18 (2006.01)

SPECTRUM MEASURING DEVICE, SPECTROSCOPIC DEVICE, AND SPECTROSCOPIC SYSTEM

CROSS-REFERENCE TO RELATED APPLICATION

This patent application is based on and claims priority pursuant to 35 U.S.C. § 119(a) to Japanese Patent Application No. 2017-038050, filed on Mar. 1, 2017 in the Japan Patent Office, the disclosure of which is hereby incorporated by reference herein.

BACKGROUND

Technical Field

The present disclosure relates to a spectrum measuring device, a spectroscopic device, and a spectroscopic system.

Background Art

In recent years, increasing demands for on-site spectroscopy have led to development of compact spectrometers. In spectroscopy, various wavelengths are used in accordance with an analysis target, such as ultraviolet light, visible light, near infrared light, and infrared light. Near infrared light (e.g., wavelengths about 800 nm to 2500 nm) including a wavelength region called biological window has a high transmittance in a sample containing high moisture including a living body. Thus, near infrared light can be effectively used for non-destructive inspection inside a sample, and there is a high demand for measurement in outdoor situations using near infrared light. This motivates the development of compact spectrometers in the near infrared region.

SUMMARY

In one aspect of this disclosure, there is provided an improved spectrum measuring device including a ribbon element, a light detection element, and circuitry. The ribbon element includes a first light reflector including a plurality of first light reflection surfaces configured to be translated in an out-of-plane direction, and a second light reflector including a plurality of second light reflection surfaces that are stable. The circuitry supplies a drive signal to the ribbon element in such a manner that a change of a displacement amount difference between the first light reflection surfaces and the second light reflection surfaces corresponds to a predetermined frequency; and acquires the light quantity data detected by the light detection element at a predetermined sampling frequency.

In another aspect of this disclosure, there is provided an improved spectroscopic device including the above-described spectrum measuring device, and a light source. A measurement target is irradiated with light from the light source, and light reflected by the measurement target is incident on the spectrum measuring device.

In still another aspect of this disclosure, there is provided an improved spectroscopic system including the above-described spectrum measuring device and an information processing apparatus. The information processing apparatus calculates, on the basis of a data stream of the light quantity data acquired by the light quantity acquirer, an intensity of light that is input to the ribbon element at each wavelength.

BRIEF DESCRIPTION OF THE DRAWINGS

The aforementioned and other aspects, features, and advantages of the present disclosure will be better understood by reference to the following detailed description when considered in connection with the accompanying drawings, wherein.

Figure 1:
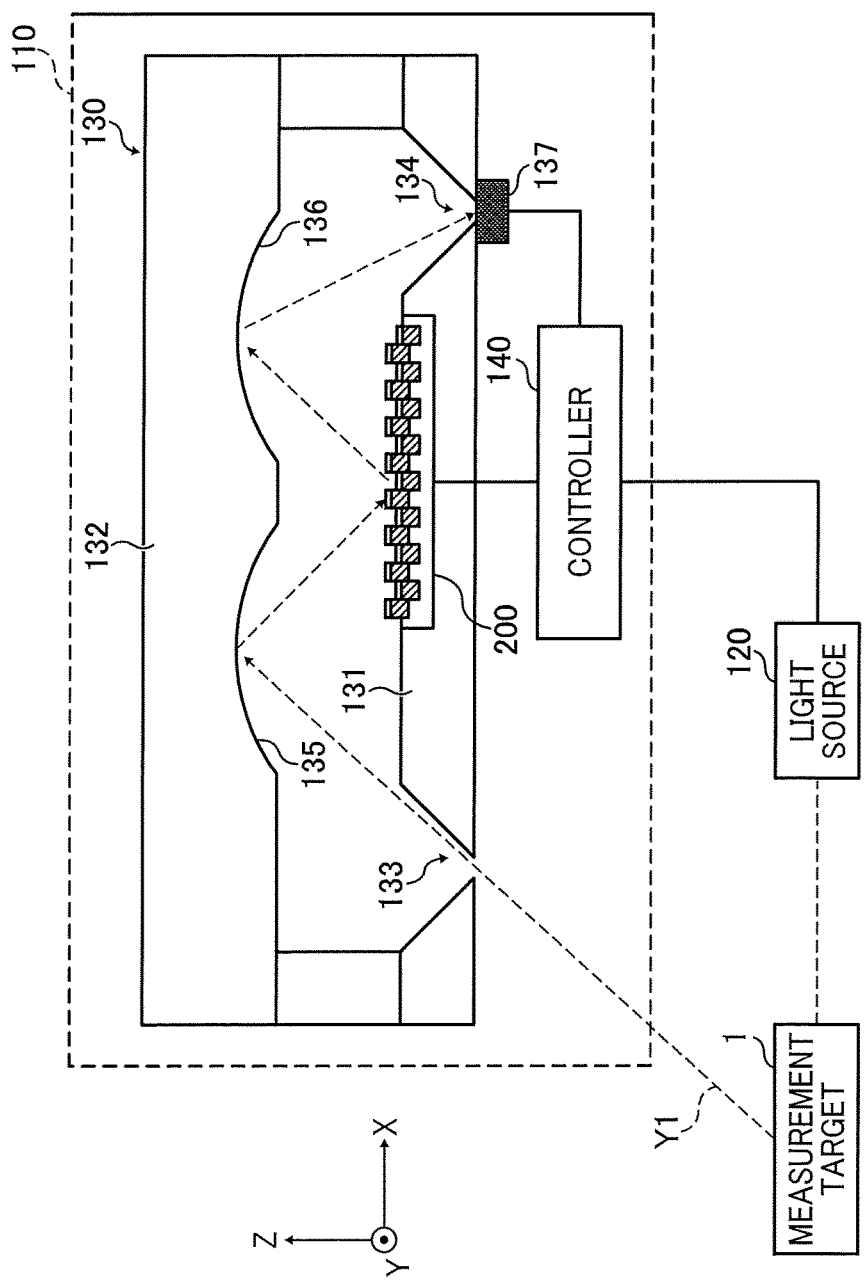
FIG. 1 illustrates a spectroscopic device according to a first embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

The present disclosure is not limited to the following embodiments, and the constituent elements of the embodiments includes those which can be easily conceived by those skilled in the art, substantially the same ones, and those in the following embodiments include those which can be easily conceived by those skilled in the art, substantially the same, and within equivalent ranges. Furthermore, various omissions, substitutions, changes and combinations of constituent elements can be made without departing from the gist of the following embodiments.

A detailed description is given below of a display device 1 and an apparatus 1000 according to embodiments of the present disclosure, with referring to the figures. The present disclosure is not limited to the following embodiments, and the constituent elements of the embodiments includes those which can be easily conceived by those skilled in the art, substantially the same ones, and those in the following embodiments include those which can be easily conceived by those skilled in the art, substantially the same, and within equivalent ranges. Furthermore, various omissions, substitutions, changes and combinations of constituent elements can be made without departing from the gist of the following embodiments.

First Embodiment

Now, a first embodiment will be described below with reference to drawings. FIG. 1 illustrates a spectroscopic device 100 according to the first embodiment.

The spectroscopic device 100 according to this embodiment includes a spectrum measuring device 110 and a light source 120. In the spectroscopic device 100 according to this embodiment, a measurement target 1 is irradiated with light from the light source 120, the light is reflected by the measurement target 1, and the reflected light is incident on the spectrum measuring device 110.

The spectrum measuring device 110 according to this embodiment includes a spectrometer 130 and a controller 140.

The spectrometer 130 includes a first substrate 131 and a second substrate 132. On the first substrate 131, a light incident portion 133 and a light emission portion 134 are provided, each of which passes through the first substrate 131 from a surface to the other surface. In addition, on a surface of the first substrate 131, a micro-electrochemical systems (MEMS) ribbon element 200 is provided between the light incident portion 133 and the light emission portion 134. In the following description, the MEMS ribbon element 200 will be referred to as the ribbon element 200.

On a surface of the second substrate 132, a first concave light-reflective portion 135 and a second concave light-reflective portion 136 are provided.

On the other surface of the first substrate 131 in the light emission portion 134, a light detection element 137 is provided. The light detection element 137 is a single-pixel photodiode chip formed of silicon (Si), germanium (Ge), indium gallium arsenide (InGaAs), or the like. In other words, the light detection element 137 is a light detection element that detects light on a single light receiving surface. The light detection element 137 outputs voltage data corresponding to the light quantity of the detected light.

In FIG. 1, a dashed arrow Y1 illustrates an example of an optical path of a certain wavelength. In the spectrometer 130 according to this embodiment, the incident light that is incident from the light incident portion 133 is reflected by the first concave light-reflective portion 135 and guided to the ribbon element 200. The incident light guided to the ribbon element 200 is subjected to wavelength dispersion by the ribbon element 200 and is reflected by the second concave light-reflective portion 136 to form an image in the light emission portion 134. In FIG. 1, the longitudinal direction of the ribbon element 200 is a y direction, the lateral direction is an x direction, and the direction perpendicular to the x direction and the y direction is a z direction.

The ribbon element 200 according to this embodiment includes a plurality of ribbons. In this embodiment, some of the plurality of ribbons are translated in the z direction, thereby serving as a reflective diffraction grating.

In the spectrometer 130 according to this embodiment, the second concave light-reflective portion 136 and the light emission portion 134 are formed and the ribbon element 200 is disposed so as to guide a specific diffracted light component to the light detection element 137.

Although FIG. 1 illustrates an example in which the ribbon element 200 is mounted on the first substrate 131, this is not restrictive. For example, the ribbon element 200 may be integrated with the first substrate 131. In other words, the ribbon element 200 may be formed as a part of the first substrate 131. In this case, the first substrate 131 may be formed of silicon or the like. Details of the ribbon element 200 will be described later.

The controller 140 according to this embodiment performs control to translate some of the plurality of ribbons included in the ribbon element 200 to change a grating pattern. In addition, in accordance with the light quantity of light received by the light detection element 137 and a combination thereof with a diffraction pattern, the controller 140 according to this embodiment performs an inverse operation to calculate light intensity at each wavelength, for example. Details of the controller 140 will be described later.

Figure 2:
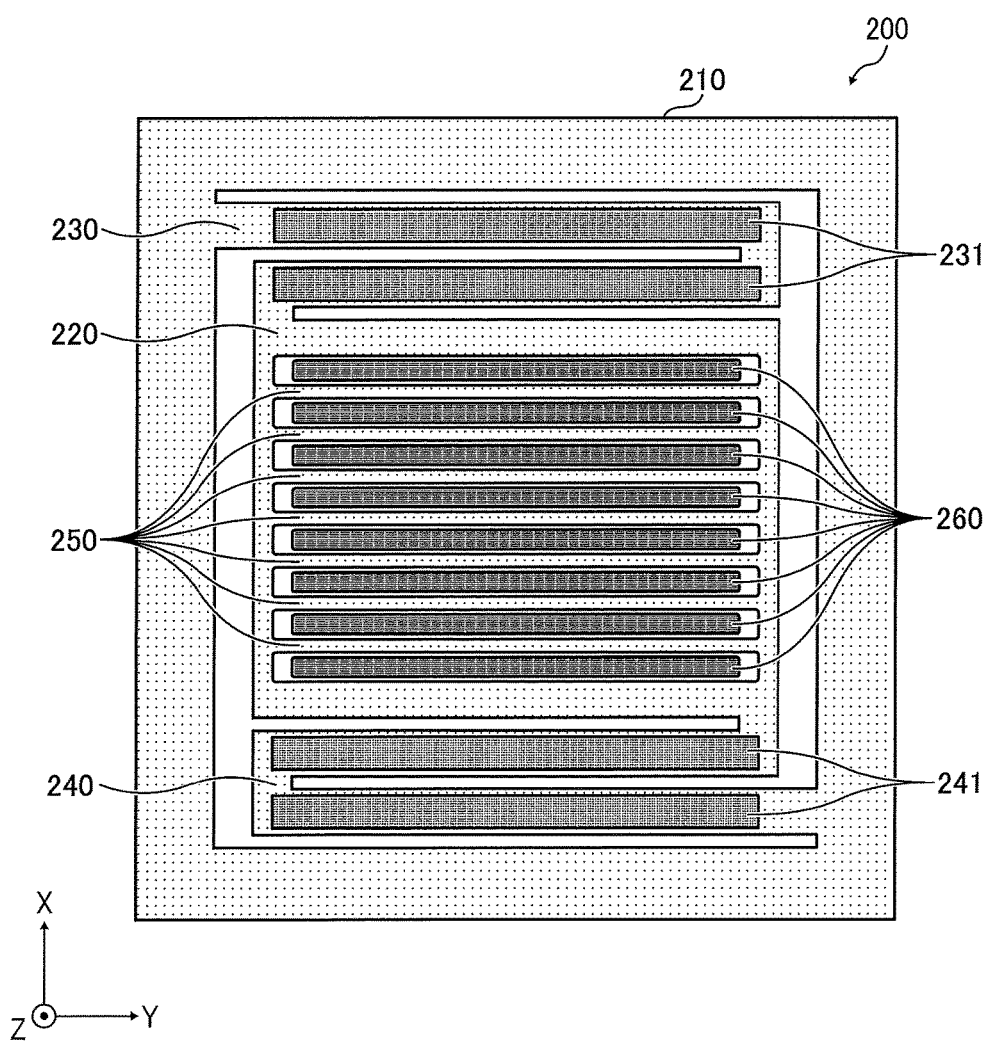
FIG. 2 illustrates an exemplary ribbon element according to the first embodiment.
Figure 3:
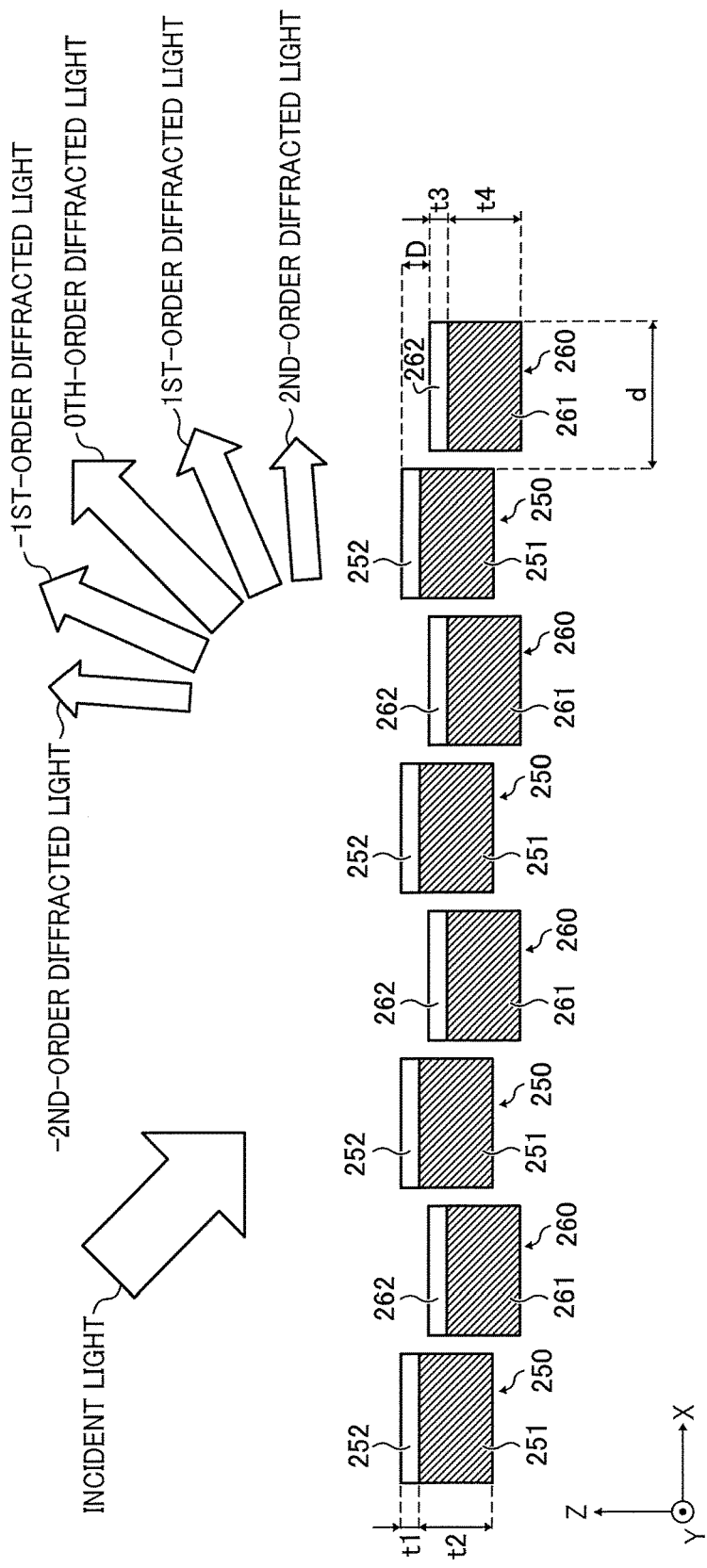
FIG. 3 illustrates movable ribbons and fixed ribbons according to the first embodiment.

Next, the ribbon element 200 according to this embodiment will be described with reference to FIGS. 2 to 4. FIG. 2 illustrates an exemplary ribbon element, the ribbon element 200, according to the first embodiment. FIG. 2 schematically illustrates a configuration of the ribbon element 200.

The ribbon element 200 according to this embodiment can be driven by, for example, any of an electrostatic method, an electromagnetic method, and a piezoelectric method. This embodiment will be described on the assumption that the ribbon element 200 is driven by a piezoelectric method. The piezoelectric method is preferably used for the spectroscopic device 100 that is aimed to be compact, because a low drive voltage can produce a large displacement.

The ribbon element 200 according to this embodiment includes a fixed frame 210, a drive frame 220, cantilevers 230 and 240, movable ribbons 250, and fixed ribbons 260.

In the ribbon element 200 according to this embodiment, the cantilevers 230 and 240 having meander structures are formed on the fixed frame 210 to face each other. The drive frame 220, on which the movable ribbons 250 are coupled, is formed between the cantilevers 230 and 240.

A piezoelectric body 231 is formed on the cantilever 230, and a piezoelectric body 241 is formed on the cantilever 240. Each of the piezoelectric bodies 231 and 241 is sandwiched between a pair of electrode thin films having substantially the same shape as the piezoelectric bodies 231 and 241 and is loaded on the cantilevers 230 and 240.

The pair of electrode thin films include an upper electrode formed above each of the piezoelectric bodies 231 and 241 and a lower electrode formed below each of the piezoelectric bodies 231 and 241. The upper electrode and the lower electrode are electrically coupled to each other. In this embodiment, a drive signal (voltage) having the same phase is supplied from the controller 140 to be applied to all of the piezoelectric bodies 231 and 241.

Being supplied with the drive signal, the piezoelectric bodies 231 and 241 contract in accordance with the applied voltage, and the cantilevers 230 and 240 are bent in the z direction.

In this embodiment, as illustrated in FIG. 2, the cantilevers 230 and 240 are folded to form meander structures. Accordingly, when the cantilevers 230 and 240 are driven, displacement in the rotational direction with respect to the y-axis at the front caused by the bending is canceled, and translation components in the z direction remain.

Upon start of translation of the cantilevers 230 and 240 in the z direction, the drive frame 220 to which the movable ribbons 250 are coupled is also translated in the z direction in accordance with the translation of the cantilevers 230 and 240. Accordingly, the movable ribbons 250 coupled to the drive frame 220 are translated altogether in the z direction with the same displacement amount maintained. On the other hand, the fixed ribbons 260 according to this embodiment remain still.

In this embodiment, a difference in the displacement in the z direction is generated in this manner between a movable reflection surface included in the movable ribbons 250 and a fixed reflection surface included in the fixed ribbons 260.

Next, movable ribbons and fixed ribbons according to this embodiment will be described with reference to FIG. 3. FIG. 3 illustrates the movable ribbons and the fixed ribbons according to the first embodiment. In FIG. 3, a schematic x-z section of the ribbon element 200 is illustrated.

In the ribbon element 200 according to this embodiment, the movable ribbons 250 and the fixed ribbons 260 are adjacent to each other and are arranged at a predetermined ribbon pitch d. The ribbon pitch d according to this embodiment is 20 m, which is substantially equal to the wavelength of the incident light, but this is not restrictive. The ribbon pitch d may be any value as long as it is not excessively wider than the wavelength of the incident light and is within a range from about the wavelength of the incident light to about 100 times wider than the wavelength.

The movable ribbons 250 include supporting members 251 and reflection surfaces 252 provided on the supporting members 251. In this embodiment, the reflection surfaces 252 included in the movable ribbons 250 are the movable reflection surfaces 252. In this embodiment, translation of all of the movable ribbons 250 in the z direction causes the movable reflection surfaces 252 to vibrate in the z direction. In other words, the translation of the movable ribbons 250 causes the movable reflection surfaces 252 to be translated in an out-of-plane direction. Note that the movable reflection surfaces 252 of all of the movable ribbons 250 included in the ribbon element 200 according to this embodiment have the same displacement amount in the z direction.

The fixed ribbons 260 include supporting members 261 and reflection surfaces 262 provided on the supporting members 261. In this embodiment, the reflection surfaces 262 included in of the fixed ribbons 260 are the fixed reflection surfaces 262.

The supporting members 251 and 261 according to this embodiment are formed of silicon, for example, and the movable reflection surfaces 252 and the fixed reflection surfaces 262 are formed by forming a metal thin film of aluminum (Al), gold (Au), or the like on the supporting members 251 and 261.

In this embodiment, a thickness t2 of the supporting members 251 of the movable ribbons 250 is equal to a thickness t4 of the supporting members 261 of the fixed ribbons 260, and a thickness t1 of the movable reflection surfaces 252 of the movable ribbons 250 is equal to a thickness t3 of the fixed reflection surfaces 262 of the fixed ribbons 260. In other words, the movable reflection surfaces 252 and the fixed reflection surfaces 262 are at the same location in the out-of-plane direction.

In this embodiment, the thicknesses t1 to t4 may be any value as long as, for example, the thicknesses t1 and t3 are each about 0.1 to 1.0 m, and the thicknesses t2 and t4 are each about 10 to 100 m.

The number of the movable ribbons 250 and the fixed ribbons 260 in the ribbon element 200 according to this embodiment may be any number as long as, for example, the total areas of the movable reflection surfaces 252 and the fixed reflection surfaces 262 are larger than the area of a light irradiation region. The light irradiation region is a region of the ribbon element 200 irradiated with the incident light.

Note that a difference between the displacement amount of the movable reflection surfaces 252 in the z direction and the displacement amount of the fixed reflection surfaces 262 in the z direction is defined as a ribbon depth D. The ribbon element 200 according to this embodiment serves as a reflective diffraction grating if the ribbon depth D is not zero. That is, in the spectroscopic device 100 according to this embodiment, if the ribbon depth D is not zero, reflection light that is incident on the ribbon element 200 and reflected by the ribbon element 200 is separated into reflective diffracted light having a diffraction angle and a diffraction efficiency in accordance with a wavelength.

An emission angle of reflected light of light incident on the ribbon element 200 with an incidence angle is obtained according to the following Formula (1). Note that, m, and d in the following Formula (1) are respectively the wavelength of light, a diffraction order, and the ribbon pitch.

$$\beta = \sin^{-1}\left(m\frac{\lambda}{d} - \sin\alpha\right) \quad \text{Formula (1)}$$

In recent years, it is known that a change in the ribbon depth of a ribbon element changes the diffraction efficiency based on the wavelength and the diffraction order.

Focusing on this respect, in this embodiment, the diffraction efficiency of −1st-order reflective diffracted light in the ribbon depth D of the ribbon element 200 according to this embodiment is calculated. The results are illustrated in FIG. 4.

Figure 4:
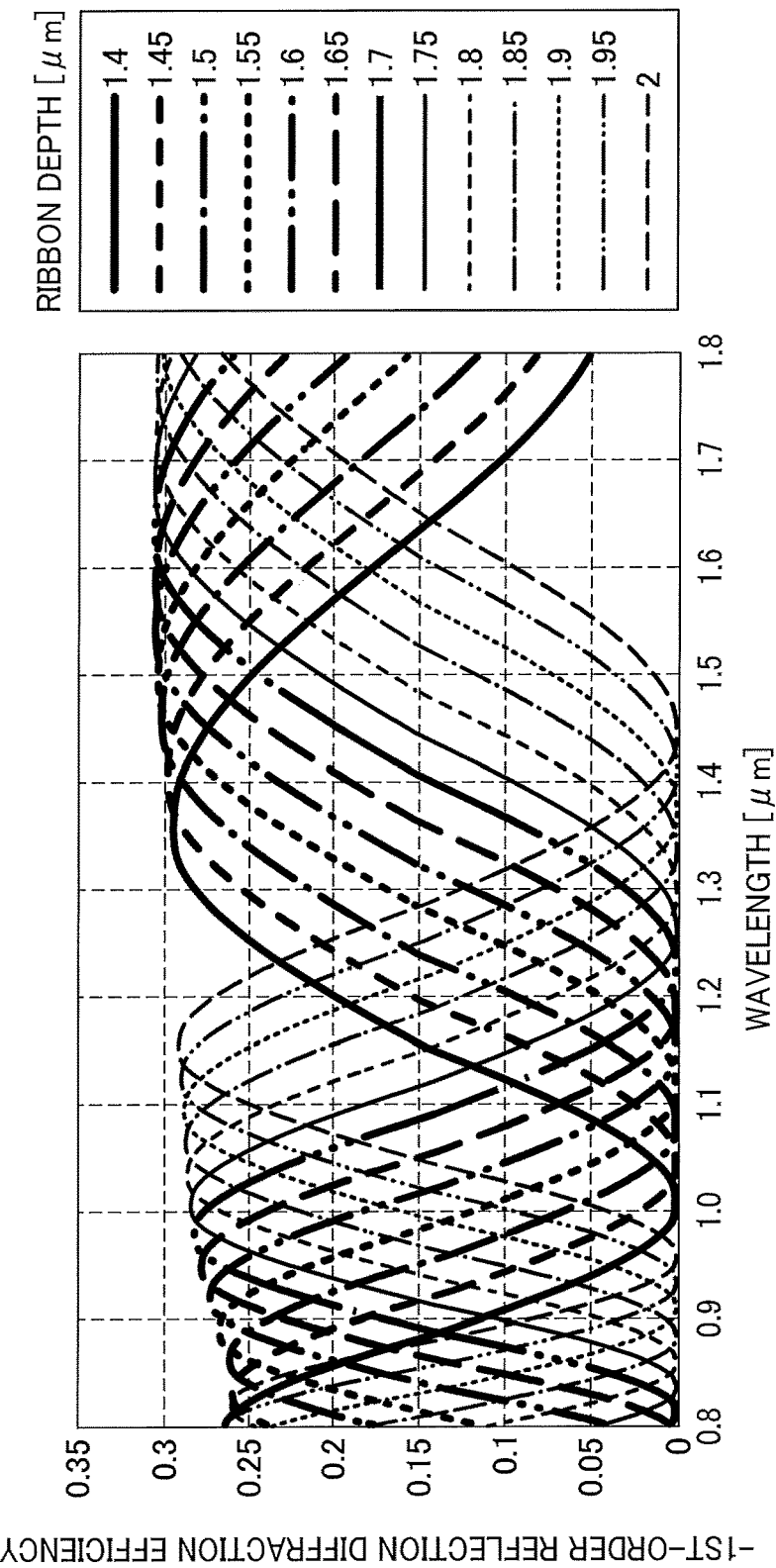
FIG. 4 illustrates the relationship between a diffraction efficiency of −1st-order diffracted light and a wavelength in each ribbon depth in the first embodiment.

FIG. 4 illustrates the relationship between the diffraction efficiency of the −1st-order diffracted light and the wavelength in each ribbon depth in the first embodiment.

FIG. 4 illustrates a change of the wavelength at which the diffraction efficiency of the reflective diffracted light peaks in accordance with a change of the ribbon depth D in the range of 1.4 in to 2.0 m. FIG. 4 indicates that the wavelength at which the diffraction efficiency of the reflective diffracted light peaks is longer as the value of the ribbon depth D increases.

Thus, in the spectroscopic device 100 according to this embodiment, the light detection element 137 is arranged in a region in which the −1st-order reflective diffracted light is received. In this embodiment, this arrangement enables the light detection element 137 to detect a light quantity obtained by integrating, on the wavelength axis, the product of the wavelength spectrum of the incident light and the diffraction efficiency of the reflective diffracted light for each wavelength.

In addition, in the ribbon element 200 according to this embodiment, a voltage to be applied to the piezoelectric bodies 231 and 241 can be controlled to change the ribbon depth D and to change the wavelength of the reflective diffracted light to be detected by the light detection element 137.

In order to make the ribbon element 200 serve as a reflective diffraction grating, the ribbon depth D is desirably larger than or equal to the wavelength of light to be separated, and is desirably larger than about 1 m to be applied to near infrared spectroscopy.

Thus, in the spectroscopic device 100 according to this embodiment, when the ribbon depth D becomes larger than about 1 m, the light quantity detected by the light detection element 137 is acquired under control of the controller 140.

In the spectroscopy in this embodiment, the order of the reflective diffracted light to be acquired is not limited to a particular order, but the reflective diffracted light detected by the light detection element 137 is preferably a diffraction-order component other than 0th-order components.

The 0-th order reflective diffracted light is reflected light in a regular reflection direction with respect to the incident light, obtained by being reflected by the ribbon element 200, and thus, it is likely that reflection light from the vicinity of the ribbons 250 and 260 are superimposed on diffraction components, thereby possibly decreasing the detection accuracy of signals.

In this embodiment, further, reflective diffracted light of a plurality of diffraction orders may be collectively acquired. In this case, the total light quantity of the reflective diffracted light of the respective diffraction orders is detected, thereby increasing the light quantity to be detected as a whole. Thus, in a case in which the reflective diffracted light of a plurality of diffraction orders is collectively acquired, a signal-to-noise (SN) ratio can be increased with respect to electric noise of the light detection element 137.

Figure 5:
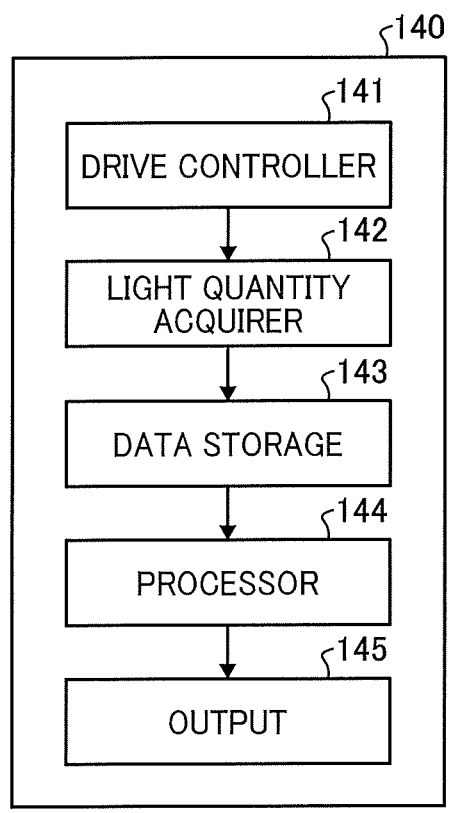
FIG. 5 illustrates functions of a controller according to the first embodiment.

Now, functions of the controller 140 according to this embodiment will be described with reference to FIG. 5. FIG. 5 illustrates functions of the controller 140 according to the first embodiment.

The controller 140 according to this embodiment is implemented by using a central processing unit (CPU) including a processor and a memory, for example. Each unit of the controller 140 described below is implemented by a program stored in the memory being read and executed by the processor.

The controller 140 according to this embodiment includes a drive controller 141, a light quantity acquirer 142, a data storage 143, a processor 144, and an output 145.

The drive controller 141 according to this embodiment supplies a drive voltage for driving the piezoelectric bodies 231 and 241 of the ribbon element 200 to the upper electrode and the lower electrode of each piezoelectric body. Specifically, the drive controller 141 according to this embodiment supplies the drive voltage to either the upper electrode or the lower electrode of each piezoelectric body as a drive signal in a triangular waveform.

The light quantity acquirer 142 according to this embodiment acquires voltage data that is output from the light detection element 137.

Specifically, when the ribbon depth D is within a predetermined range, the light quantity acquirer 142 according to this embodiment performs sampling of the voltage data in a predetermined interval, the voltage data being output from the light detection element 137. The light quantity acquirer 142 may be implemented by using, for example, an analog-to-digital (A/D) converter or the like.

Note that the voltage data that is output from the light detection element 137 corresponds to the light quantity detected by the light detection element 137 and may be referred to as light quantity data indicating the light quantity.

The predetermined range of the ribbon depth D is a range in which the ribbon element 200 serves as the reflective diffraction grating and in which a change of the wavelength at which the diffraction efficiency peaks is obvious. In this embodiment, for example, the predetermined range of the ribbon depth D is set to 1.4 m to 2.0 m. The process of detecting the light quantity by the light quantity acquirer 142 will be described later in detail.

The data storage 143 stores the voltage data acquired by the light quantity acquirer 142.

The processor 144 according to this embodiment calculates the intensity of the reflective diffracted light from the voltage data stored in the data storage 143. Details of the calculation performed by the processor 144 will be described later.

The output 145 outputs the results of the calculation performed by the processor 144. For example, the output 145 according to this embodiment may display the calculation results on a display included in the spectroscopic device 100 or may output the calculation results to a storage medium, an external device, or the like connected to the spectroscopic device 100.

Figure 6:
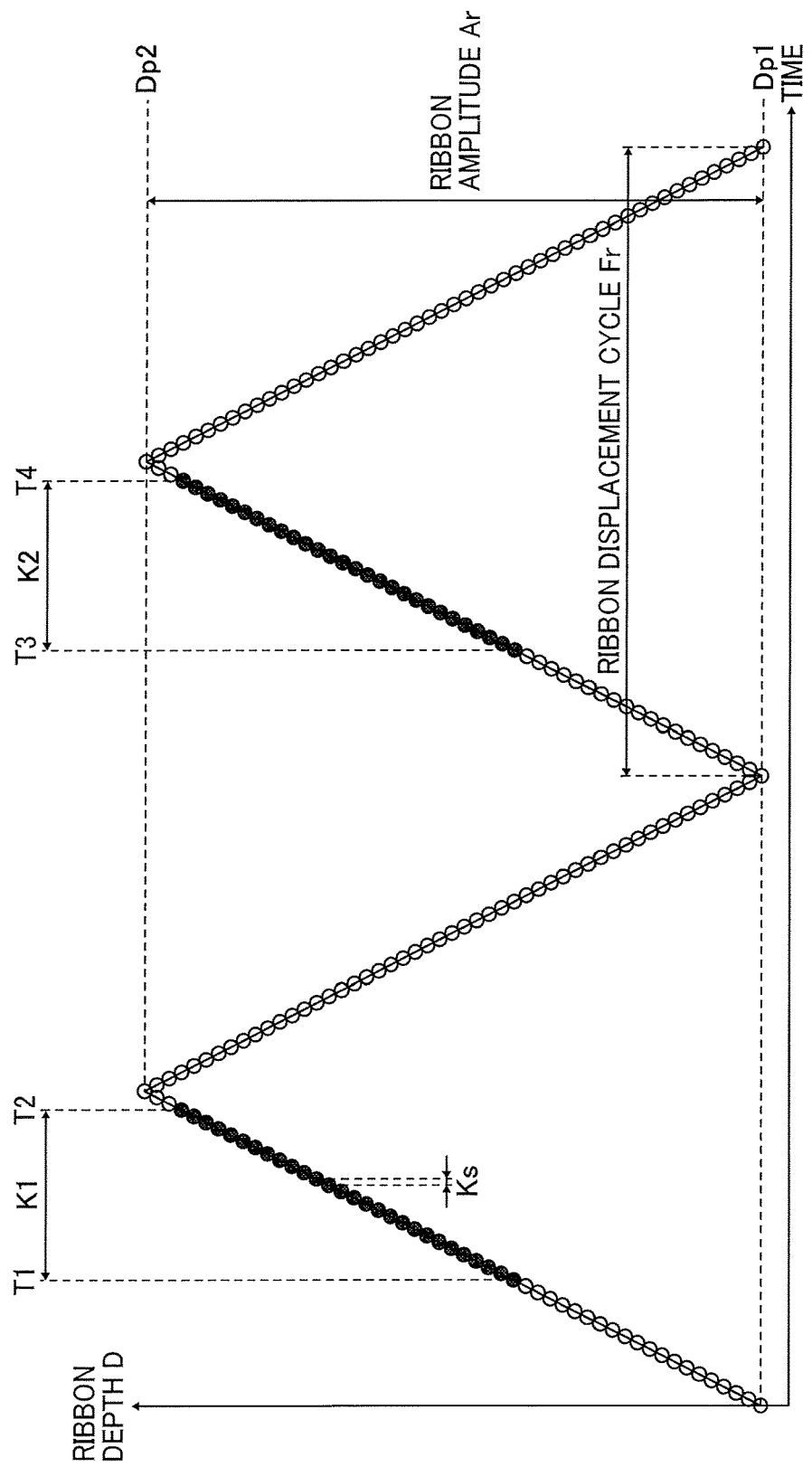
FIG. 6 illustrates detection of a light quantity by a light quantity acquirer according to the first embodiment.

Next, the detection of the light quantity by the light quantity acquirer 142 according to this embodiment will be described with reference to FIG. 6. FIG. 6 illustrates the detection of the light quantity by the light quantity acquirer 142 according to the first embodiment.

The graph in FIG. 6 illustrates a change of the ribbon depth D with respect to time with the horizontal axis representing time and the vertical axis representing the ribbon depth D.

In this embodiment, upon the drive controller 141 supplying a drive signal in a triangular waveform to the piezoelectric bodies 231 and 241 to translate the movable reflection surfaces 252 of the movable ribbons 250 in the z direction, the ribbon depth D changes in a triangular waveform with respect to time as illustrated in the graph in FIG. 6. That is, the ribbon depth D with respect to time changes in accordance with a change of the drive signal supplied to the ribbon element 200. In other words, the frequency of the change of the ribbon depth D corresponds to the frequency of the drive signal, and the ribbon depth D changes in accordance with the frequency of the drive signal.

In the example of FIG. 6, the ribbon depth D changes from a ribbon depth Dp1 to a ribbon depth Dp2 in accordance with translation of the movable ribbons 250. Thus, a maximum displacement amount of the ribbon depth D with respect to time is Ar, which is an absolute value of a difference between the ribbon depth Dp1 and ribbon depth Dp2. In the following description, the maximum displacement amount of the ribbon depth D will be referred to as a ribbon amplitude Ar. In addition, in the example of FIG. 6, the cycle of the change of the ribbon depth D with respect to time is Fr. In the following description, the cycle Fr of the change of the ribbon depth D will be referred to as a ribbon displacement cycle Fr. From the ribbon amplitude Ar and the ribbon displacement cycle Fr, it is found that the drive signal in a triangular waveform, which is a voltage with a cycle corresponding to the ribbon displacement cycle Fr and an amplitude corresponding to the ribbon amplitude Ar, is supplied to the ribbon element 200.

In addition, in the example of FIG. 6, between a timing T1 and a timing T2, and between a timing T3 and a timing T4, the voltage data detected by the light detection element 137 is acquired. That is, a period K1 from the timing T1 to the timing T2 and a period K2 from the timing T3 to the timing T4 are periods during which the ribbon depth D is within the predetermined range. In the following description, the periods K1 and K2 are respectively referred to as light-quantity storing periods K1 and K2.

Accordingly, during the light-quantity storing periods K1 and K2, the light quantity acquirer 142 according to this embodiment acquires the voltage data detected by the light detection element 137 in each interval Ks for acquiring the voltage data. Note that a timing for the light-quantity storing periods K1 and K2 may be stored in advance in the light quantity acquirer 142.

Although FIG. 6 illustrates an example in which each light-quantity storing period is provided per a cycle of displacement of the ribbon depth D, this is not restrictive. The light-quantity storing period may be any period as long as the ribbon depth D is within the predetermined range. Accordingly, for example, per a cycle of displacement of the ribbon depth D, in addition to the light-quantity storing period K1 or K2, during which the ribbon depth D increases, a period during which the ribbon depth D decreases within the predetermined range may be set as a light-quantity storing period.

In this embodiment, during the light-quantity storing periods K1 and K2, a stream of the voltage data acquired by the light quantity acquirer 142 is stored in the data storage 143 as data for processing performed by the processor 144. In this embodiment, by storing the stream of the voltage data acquired during the light-quantity storing periods K1 and K2, the stream of the voltage data in a time domain of the ribbon depth D with which an obvious change of the peak of the diffraction efficiency is obtained can be used for processing.

In this embodiment, voltage data groups V1 to Vn stored in the data storage 143 are associated with the light intensity of wavelength components 1 to n included in the incident light in a matrix as in Formula (2).

$$\begin{bmatrix} V1 \\ \vdots \\ Vk \\ \vdots \\ Vn \end{bmatrix} = \begin{bmatrix} a11 & \ldots & a1k & \ldots & a1n \\ \vdots & & \vdots & & \vdots \\ ak1 & \ldots & akk & \ldots & akn \\ \vdots & & \vdots & & \vdots \\ an1 & \ldots & ank & \ldots & ann \end{bmatrix} \begin{bmatrix} I\lambda 1 \\ \vdots \\ I\lambda k \\ \vdots \\ I\lambda n \end{bmatrix} \quad \text{Formula (2)}$$

In Formula (2), Ik is the light intensity of a wavelength k included in the incident light. In addition, in Formula (2), a matrix component akk is a predetermined factor obtained from the relationship between a voltage data item Vk and the light intensity Ik for a reference light source having known spectrum characteristics. Note that Formula (2) and each factor may be stored in the processor 144.

The processor 144 according to this embodiment calculates Ik according to Formula (2) by using the voltage data groups stored in the data storage 143 to obtain spectrum characteristics of the incident light of the spectroscopic device 100 in a case in which the wavelength region is divided into n pieces.

To use the voltage data. Vk and the predetermined factor akk (k=1 to n) obtained at different times to calculate Ik according to Formula (2) is to calculate the product of the matrix in Formula (2).

Accordingly, according to this embodiment, the load of calculation can be significantly reduced compared with Fourier transform infrared spectroscopy, which requires Fourier transform.

Here, the relationship between a measurement time of the spectroscopic device 100 and the frequency of the voltage data sampling performed b the light quantity acquirer 142 will be described.

The following example is a case in which S times of the voltage data is output from the spectroscopic device 100 per second and in which the ribbon element 200 is translated in NI cycles while the voltage data is output once.

In this case, the drive frequency of the ribbon element 200 is S·M. Note that the drive frequency of the ribbon element 200 is the frequency of the drive signal supplied from the drive controller 141 to the ribbon element 200.

Provided that n is the wavelength division number in the wavelength components of the incident light, the spectroscopic device 100 is required to obtain n voltage data items or more to perform calculation according to Formula (2).

A voltage data sampling frequency fs is represented by the following Formula (3) where is a time ratio used for acquiring the voltage data items V1 to Vn in a cycle of translation of the ribbon element 200.

$$f_s = \frac{S \cdot M \cdot n}{\eta} \quad \text{Formula (3)}$$

Figure 7:
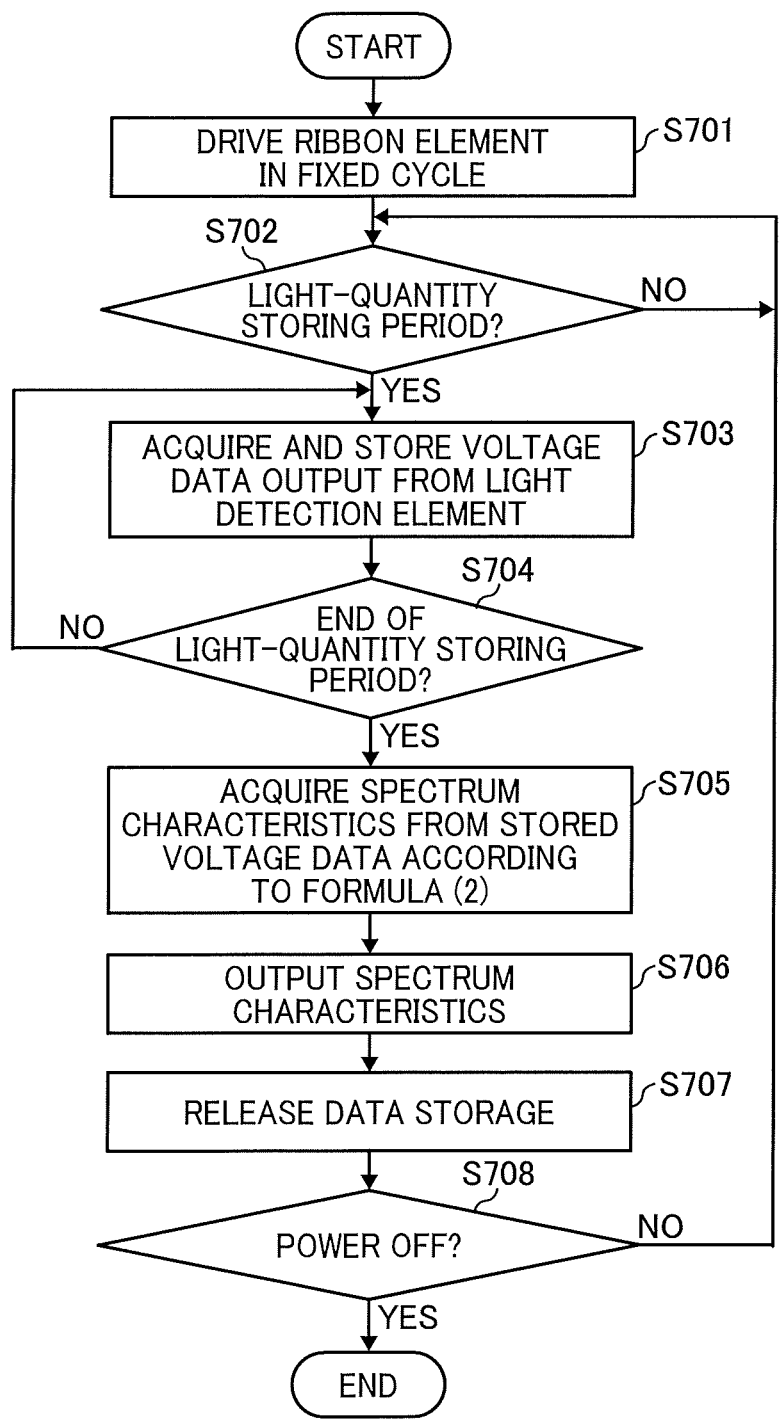
FIG. 7 is a flowchart illustrating operations of the controller according to the first embodiment.

For example, in formula (3), if S=10 times/second, M=10, n=100, =25%, the voltage data sampling frequency fs is fs=40 kHz. That is, the light quantity acquirer 142 according to this embodiment may acquire the voltage data detected by the light detection element 137 in a cycle of 40 kHz during the light-quantity storing periods K1 and K2. This function can be easily realized by, for example, an inexpensive A/D converter or the like, thereby making the configuration of the controller 140 simple and inexpensive Next, operations of the controller 140 according to this embodiment will be described below with reference to FIG. 7. FIG. 7 is a flowchart illustrating the operations of the controller 140 according to the first embodiment.

Upon the power of the spectroscopic device 100 being switched on and incident light being detected, the controller 140 according to this embodiment causes the drive controller 141 to drive the ribbon element 200 in a fixed cycle (step S701) in other words, the controller 140 causes the drive controller 141 to supply a drive signal to the ribbon element 200 in a fixed cycle to move the movable ribbons 250, thereby changing heights of the movable reflection surfaces 252 and the fixed reflection surfaces 262 to generate the ribbon depth D.

Subsequently, the controller 140 determines, by using the light quantity acquirer 142, whether a light-quantity storing period has started (step S702). Note that the light quantity acquirer 142 according to this embodiment stores, for example, the value of the drive voltage at the timings T1 and T3 at which the light-quantity storing periods K1 and K2 start, and when the value of the drive signal becomes the stored drive voltage, the light quantity acquirer 142 may detect the start of a light-quantity storing period.

If a light-quantity storing period has not started yet in step S702, the controller 140 waits for the light-quantity storing period. If a light-quantity storing period has started in step S702, on the basis of the predetermined sampling frequency, the light quantity acquirer 142 acquires the voltage data that is output from the light detection, element 137, and the data storage 143 stores the voltage data (step S703). Note that the sampling frequency may be set in advance in the light quantity acquirer 142.

Subsequently, the light quantity acquirer 142 determines whether the light-quantity storing period has ended (step S704). Note that the light quantity acquirer 142 according to this embodiment stores, for example, the value of the drive voltage at the timings T2 and T4 at which the light-quantity storing periods K1 and K2 end, and when the value of the drive signal becomes the stored drive voltage, the light quantity acquirer 142 may detect the end of the light-quantity storing period.

If the light-quantity storing period has not ended yet in step S704, the light quantity acquirer 142 returns to step S703. If the light-quantity storing period has ended in step S704, on the basis of the voltage data group stored in the data storage 143 and Formula (2), the controller 140 causes the processor 144 to calculate spectrum characteristics of the incident light that is incident on the ribbon element 200 (step S705).

Subsequently, the controller 140 causes the output 145 to output the calculated spectrum characteristics (step S706). Subsequently, the controller 140 deletes the voltage data stored in the data storage 143 to release the data storage 143 (step S707).

Subsequently, the controller 140 determines whether an instruction for turning off the spectroscopic device 100 has been received (step S708). If an instruction for turning off has not been received in step S708, the controller 140 returns to step S702. If an instruction for turning off has been received in step S708, the controller 140 ends the process.

As described above, this embodiment can eliminate the necessity for, calculation including Fourier transform or the like and can reduce a load of processing performed by the processor 144. In addition, this embodiment realizes, with a simple configuration, the function for acquiring the voltage data from the light detection element 137 in each predetermined interval. Thus, this embodiment can simplify the configuration of the controller 140, contributing to reduction of the cost.

Furthermore, this embodiment causes displacement of the movable ribbons 250 in the ribbon element 200 to change the ribbon depth D, thereby making the ribbon element 200 serve as a reflective diffraction grating and changing the wavelength of the reflective diffracted light detected by the light detection element 137.

Thus, this embodiment can eliminate the necessity for a component such as a deflection mirror to change the light emission direction, thereby simplifying the configuration of the spectrometer 130.

Therefore, this embodiment enables stable spectrum measurement with an inexpensive configuration.

Second Embodiment

Now, a second embodiment will be described below with reference to a drawing. The second embodiment differs from the first embodiment in that the supporting member of the movable ribbons and the supporting member of the fixed ribbons have difference thicknesses. Accordingly, in the description of the second embodiment below, different points from the first embodiment will be described, and components having substantially the same function and configuration as those in the first embodiment will be denoted by the same reference numerals as in the first embodiment and will be omitted from the following description.

Figure 8:
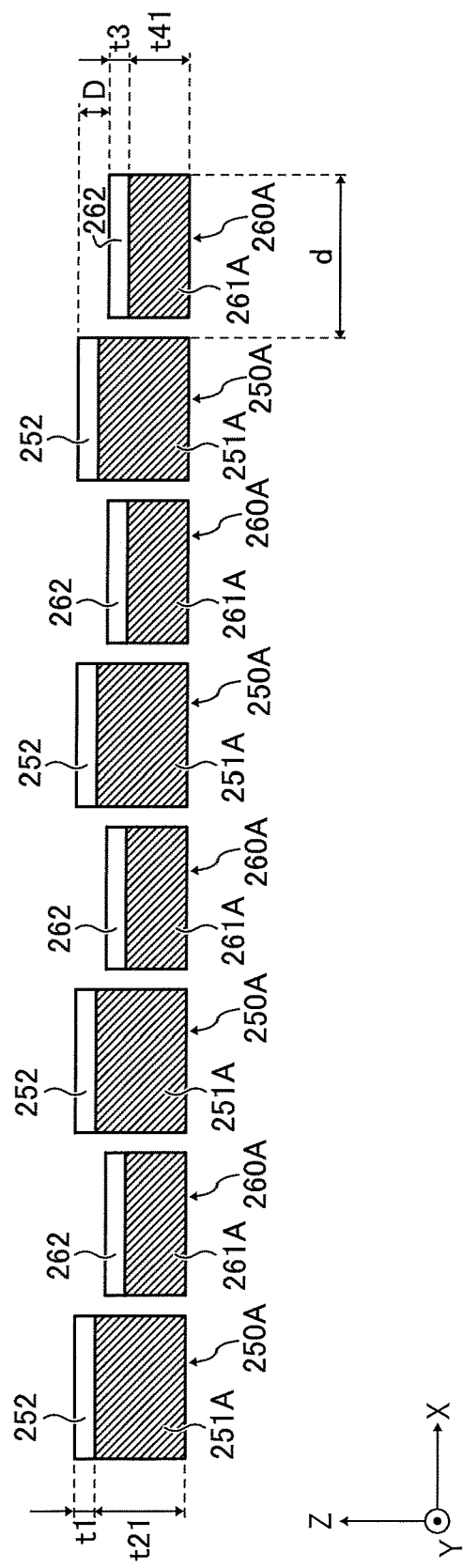
FIG. 8 illustrates movable ribbons and fixed ribbons according to a second embodiment.

FIG. 8 illustrates the movable ribbons and the fixed ribbons according to the second embodiment. In FIG. 8, a schematic x-z section of the ribbon element 200 according to the second embodiment is illustrated. Note that FIG. 8 illustrates a state in which a drive signal is not supplied to the ribbon element 200.

In this embodiment, a thickness t21 of supporting members 251A of movable ribbons 250A differs from a thickness t41 of supporting members 261A of fixed ribbons 260A. In addition, the thickness of the movable reflection surfaces 252 differs in advance from the thickness of the fixed reflection surfaces 262. In other words, in this embodiment, the ribbon depth D, which is a difference between the thickness t21 of the supporting members 251A and the thickness t41 of the supporting members 261A, is provided in advance, and thereby the movable reflection surfaces 252 and the fixed reflection surfaces 262 are located at different locations in the out-of-plane direction.

Specifically, before a metal thin film is formed on the movable ribbons 250A and the fixed ribbons 260A, supporting members corresponding to the movable reflection surfaces 252 or the fixed reflection surfaces 262 are etched by reactive ion etching (RIE), thereby differing the thicknesses of the two types of supporting members.

Thus, in this embodiment, in a case in which a drive signal is supplied to the ribbon element 200, a time domain in which a change of the wavelength at which the diffraction efficiency of the reflective diffracted light peaks is obvious can be expanded. In other words, in this embodiment, in a case in which a drive signal is supplied, a light-quantity storing period can be made longer than that in the first embodiment This equals to expansion of the time ratio in Formula (3).

Accordingly, this embodiment can, for example, lower the sampling frequency of the A/D converter realizing the light quantity acquirer 142, contributing to reduction of the cost of the spectroscopic device 100.

In addition, this embodiment can make the light-quantity storing period longer than that in the first embodiment. Thus, the number of voltage data items to be acquired is increased, increasing the wavelength optical resolution of the spectroscopic device 100.

Furthermore, this embodiment can generate the ribbon depth D that is substantially equal to that in the first embodiment with a lower voltage than the drive voltage supplied to the ribbon element 200 according to the first embodiment. Thus, this embodiment can produce substantially the same effects as those in the first embodiment with a lower drive voltage than that in the first embodiment.

Third Embodiment

Now, a third embodiment will be described below with reference to drawings. The third embodiment differs from the first embodiment in that an average of the voltage data acquired by the light acquirer is used for processing performed by the processor. Accordingly, in the description of the third embodiment below, different points from the first embodiment will be described, and components having substantially the same function and configuration as those in the first embodiment will be denoted by the same reference numerals as in the first embodiment and will be omitted from the following description.

Figure 9:
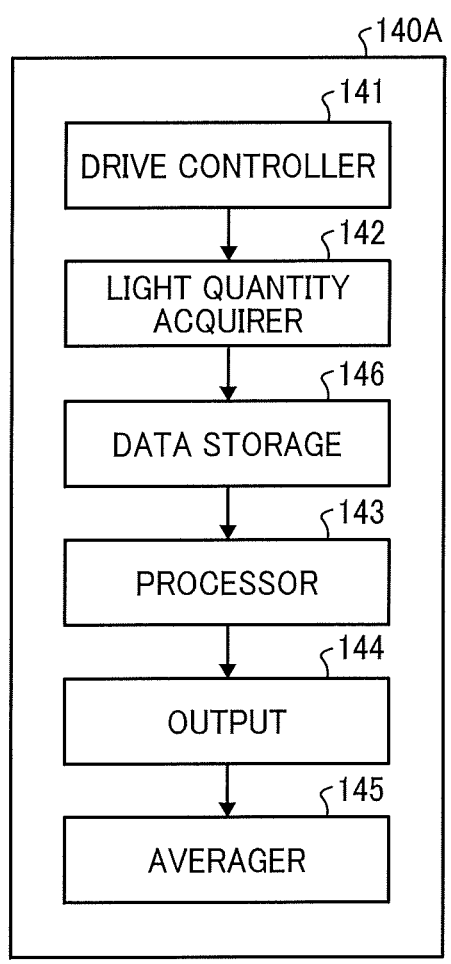
FIG. 9 illustrates functions of a controller according to a third embodiment.

FIG. 9 illustrates functions of a controller 140A according to the third embodiment. The controller 140A according to this embodiment includes the drive controller 141, the light quantity acquirer 142, the data storage 143, the processor 144, the output 145, and an averager 146.

The averager 146 according to this embodiment calculates an average of the voltage data acquired by the light quantity acquirer 142. Although the averager 146 is provided in the controller 140A as a different function from the processor 144 in the example of FIG. 9, this is not restrictive. The processor 144 may perform the process of the averager 146.

Figure 10:
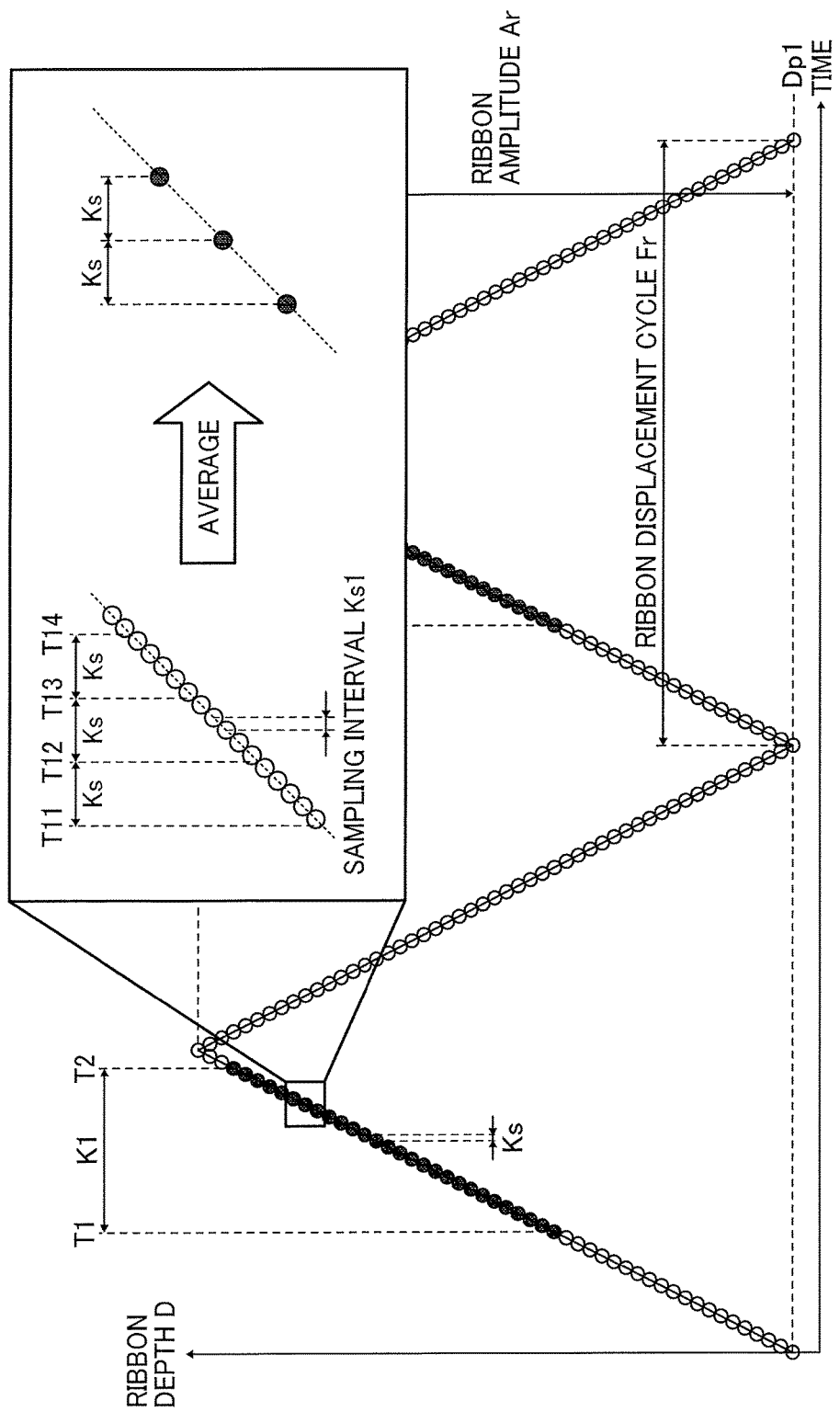
FIG. 10 illustrates an averaging process of voltage data in the third embodiment.

Next, an averaging process performed by the averager 146 will be described below. FIG. 10 illustrates the averaging process of voltage data in the third embodiment.

In a case in which the sampling frequency can be made higher than the voltage data sampling frequency fs, which is required for the performance of the spectroscopic device 100, the averager 146 according to this embodiment averages the acquired voltage data. The voltage data sampling frequency fs, which is required for the performance of the spectroscopic device 100, can be given according to Formula (3).

The case in which the sampling frequency can be made higher than the sampling frequency fs given according to Formula (3) is, for example, a case in which the sampling frequency can be made higher than the sampling frequency fs depending on the performance of the A/D converter realizing the light quantity acquirer 142, or the like.

In FIG. 10, Ks is an interval for acquiring voltage data based on the sampling frequency fs, and Ks1 is an interval for acquiring voltage data based on a sampling frequency higher than the sampling frequency fs.

In this case, since the interval Ks1 is shorter than the interval Ks, a plurality of voltage data items are acquired during the interval Ks. Thus, the averager 146 according to this embodiment averages the plurality of voltage data items.

Specifically, for example, the averager 146 may average a plurality of voltage data items acquired during the interval Ks1 from a timing T11 to a timing T12 and may use the result as voltage data at the timing T12. Alternatively, for example, the averager 146 may average a plurality of voltage data items acquired before and after the timing T12 with the timing T12 located at the center and may use the result as the voltage data at the timing T12.

That is, the averager 146 according to this embodiment may average voltage data acquired around a timing (time) at which the voltage data is acquired on the basis of the sampling frequency fs.

Figure 11:
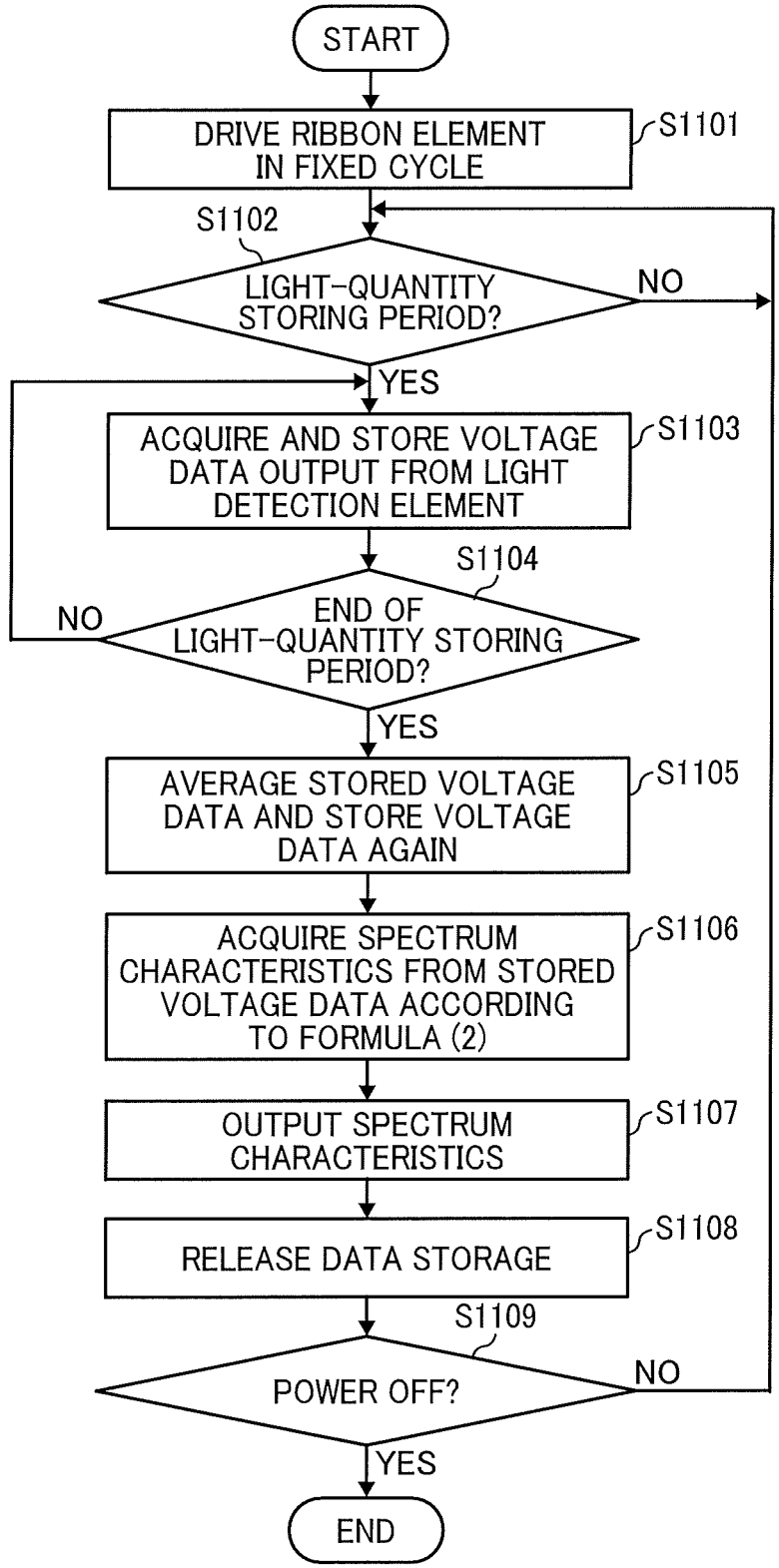
FIG. 11 is a flowchart illustrating operations of the controller according to the third embodiment.

Next, operations of the controller 140A according to this embodiment will be described below with reference to FIG. 11. FIG. 11 is a flowchart illustrating the operations of the controller 140A according to the third embodiment.

The process from step S1101 to step S1104 in FIG. 11 is substantially the same as the process from step S701 to step S704 in FIG. 7 and therefore will be omitted from the description.

Upon the end of the light-quantity storing period in step S1104, the controller 140A causes the averager 146 to average voltage data stored in the data storage 143.

The averager 146 according to this embodiment obtains a timing at which the voltage data is acquired on the basis of the sampling frequency fs given according to Formula (3). Subsequently, the averager 146 causes the data storage 143 to store the average of the voltage data acquired around this timing as voltage data at this timing (step S1105), and proceeds to step S1106.

Specifically, the averager 146 obtains, for example, the timings T11, T12, T13, and the like based on the interval Ks (see FIG. 10). The averager 146 then calculates the average of voltage data acquired in each interval Ks1 and causes the data storage 143 to store the calculated average for each of the timings T11, T12, and T13.

Note that the sampling frequency fs may be given in advance and stored in the averager 146, or may be calculated according to Formula (3).

The process from step S1106 to step S1109 is substantially the same as the process from step S705 to step S708 in FIG. 7 and therefore will be omitted from the description.

This embodiment uses the averaged voltage data in the above manner, thereby suppressing variations of voltage data and influence of noise components, and thus, highly reliable spectrum measurement is enabled.

Fourth Embodiment

Now, a fourth embodiment will be described below with reference to a drawing. The fourth embodiment differs from the first embodiment in that the drive signal of the ribbon element 200 is a sinusoidal signal. Accordingly, in the description of the fourth embodiment below, different points from the first embodiment will be described, and components having substantially the same function and configuration as those in the first embodiment will be denoted by the same reference numerals as in the first embodiment and will be omitted from the following description.

Figure 12:
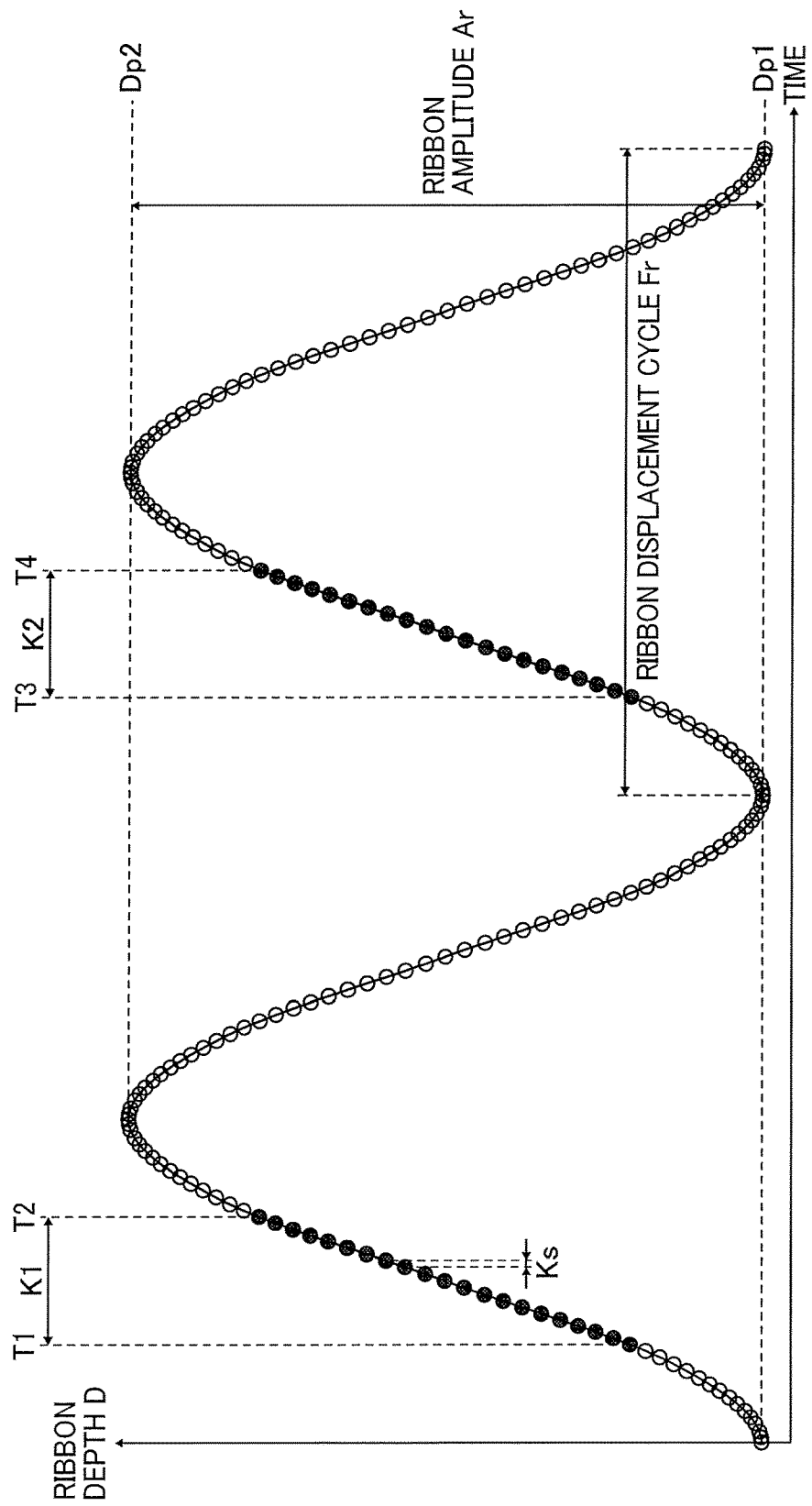
FIG. 12 illustrates detection of a light quantity according to a fourth embodiment.

FIG. 12 illustrates detection of a light quantity according to the fourth embodiment. FIG. 12 illustrates a change of the ribbon depth D with respect to time when the drive controller 141 supplies a sinusoidal drive signal to the piezoelectric bodies 231 and 241 and the movable reflection surfaces 252 of the movable ribbons 250 is translated in the z direction.

Since the movable reflection surfaces 252 according to this embodiment change in accordance with the drive signal supplied from the drive controller 141, the waveform representing the change of the ribbon depth D with respect to time is also sinusoidal as illustrated in FIG. 12.

The ribbon element 200 has a resonance mode such that vibrations are increased with respect to a signal at a specific frequency.

In this embodiment, if a resonance frequency of the ribbon element 200 is known in advance, a sinusoidal signal can be used as the drive signal to suppress unintentional excitation of the resonance mode of the ribbon element 200.

If the sinusoidal signal can be used as the drive signal, the drive signal includes frequency components corresponding to a frequency indicating the displacement of the ribbon depth D. In this embodiment, the frequency indicating the displacement of the ribbon depth D differs from the resonance frequency of the ribbon element 200 so that the ribbon depth D can reflect the waveform of the drive signal and the waveform can be changed in a sinusoidal shape with respect to time.

In contrast, if the drive signal has a triangular waveform or a sawtooth waveform, a drive signal component is present in a high frequency band, which may unintentionally excite the resonance mode of the ribbon element 200. Upon excitation of the resonance mode, high-frequency vibrations near the resonance frequency of the ribbon element 200 are superimposed, and the ribbon depth D does not change linearly with respect to time. Thus, control of the displacement of the ribbon depth D may be difficult.

In this embodiment, a sinusoidal signal is used as the drive signal, thereby suppressing excitation of the resonance mode.

In addition, by using a sinusoidal signal as the drive signal, the resonance of the ribbon element 200 can be actively utilized.

In this embodiment, for example, in a case in which the ribbon element 200 has a resonance mode such that the movable reflection surfaces 252 are translated in the z direction and the resonance frequency is known, the drive signal may be a sinusoidal signal having a frequency near the resonance frequency of the ribbon element 200. In this embodiment, by using such a sinusoidal signal as the drive signal, a change of the ribbon depth D in the predetermined range can be obtained with an extremely low drive voltage.

Fifth Embodiment

Now, a fifth embodiment will be described below with reference to a drawing. The fifth embodiment differs from the first embodiment in that the processing performed by the controller is performed by an external device. Accordingly, in the description of the fifth embodiment below, different points from the first embodiment will be described, and components having substantially the same function and configuration as those in the first embodiment will be denoted by the same reference numerals as in the first embodiment and will be omitted from the following description.

Figure 13:
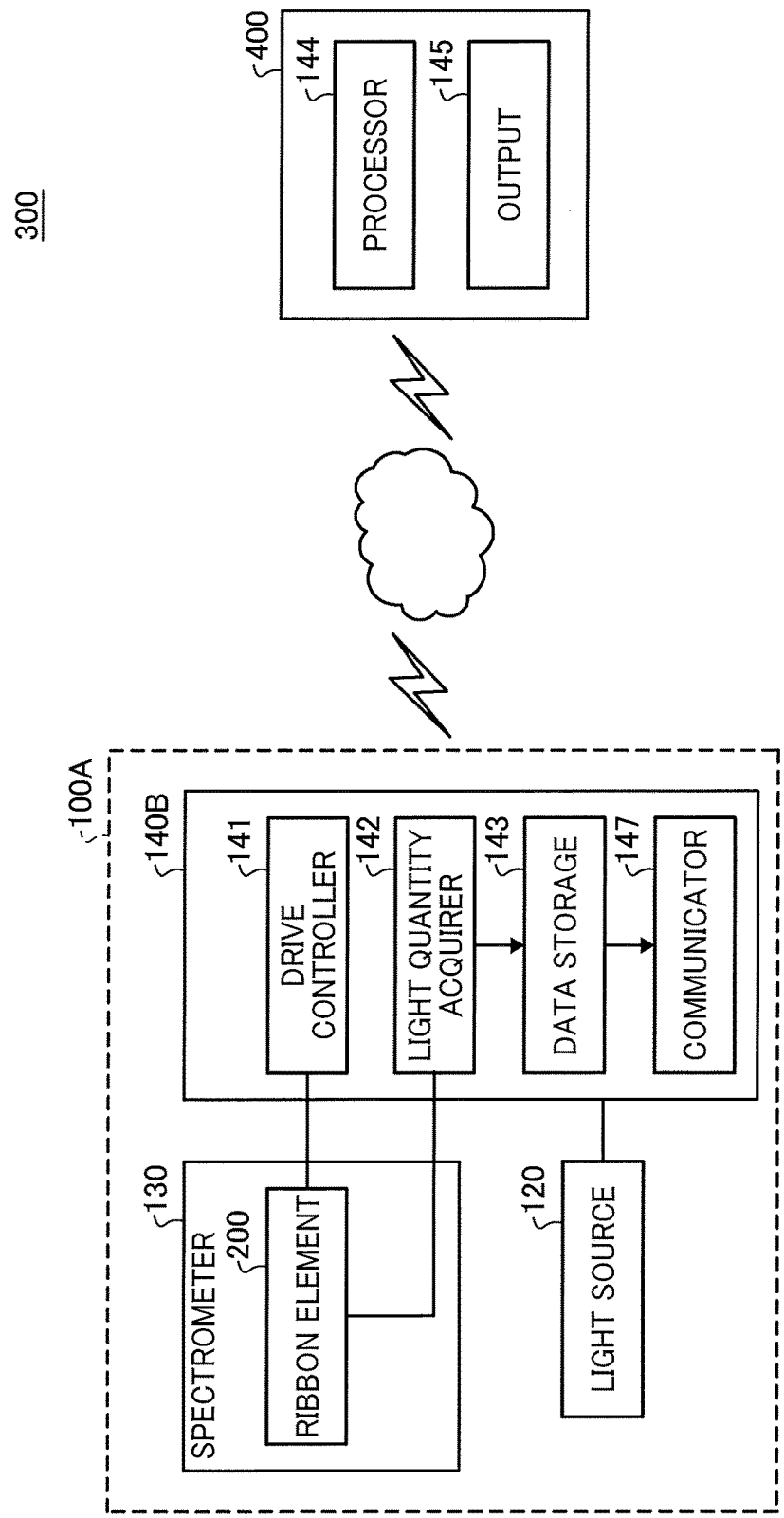
FIG. 13 illustrates an exemplary spectroscopic system according to a fifth embodiment.

FIG. 13 illustrates an exemplary spectroscopic system, a spectroscopic system 300, according to the fifth embodiment. The spectroscopic system 300 according to this embodiment includes a spectroscopic device 100A and a server 400. In the spectroscopic system 300 according to this embodiment, voltage data acquired by the spectroscopic device 100A is transmitted to the server 400, and the server 400 performs various kinds of processing.

The spectroscopic device 100A according to this embodiment includes the light source 120, the spectrometer 130, and a controller 140B.

The controller 140B according to this embodiment includes the drive controller 141, the light quantity acquirer 142, the data storage 143, and a communicator 147. The communicator 147 transmits voltage data stored in the data storage 143 to the server 400.

For example, upon the end of a light-quantity storing period, the communicator 147 according to this embodiment may transmit a voltage data group stored in the data storage 143 to the server 400. Alternatively, when incident light on the ribbon element 200 is not detected any longer, the communicator 147 according to this embodiment may transmit a voltage data group stored in the data storage 143 to the server 400.

The server 400 according to this embodiment is a typical computer including a processing device and a memory device.

The server 400 includes the processor 144 and the output 145. Upon reception of the voltage data group from the spectroscopic device 100A, the processor 144 calculates the light intensity of wavelength components 1 to n according to Formula (2) to obtain spectrum characteristics in a case in which the wavelength region is divided into n pieces.

The output 145 may output the result obtained by the processor 144 to a display or the like included in the server 400. Alternatively, the output 145 may cause a terminal device or the like connected to the server 400 to output the result obtained by the processor 144.

In the above manner, since the processor 144 is provided in the server 400, this embodiment can reduce the load of the process performed by the controller 140B in the spectroscopic device 100A, and thereby the spectroscopic device 100A can measure a spectrum with an inexpensive configuration and high stability.

Sixth Embodiment

Now, a sixth embodiment will be described below with reference to a drawing. The sixth embodiment differs from the first embodiment in that the spectroscopic device is transportable. Accordingly, in the description of the sixth embodiment below, different points from the first embodiment will be described, and components having substantially the same function and configuration as those in the first embodiment will be denoted by the same reference numerals as in the first embodiment and will be omitted from the following description.

Figure 14:
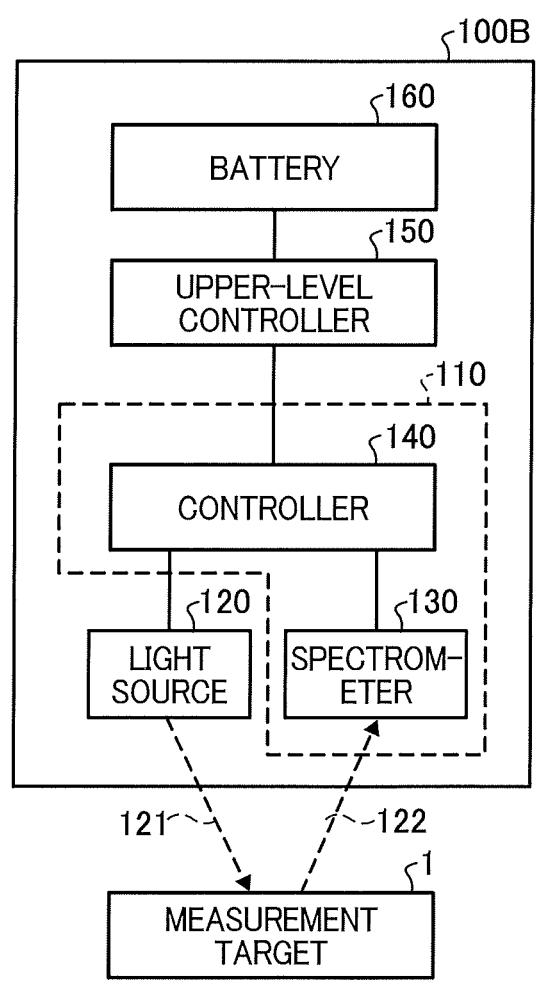
FIG. 14 illustrates a spectroscopic device according to a sixth embodiment.

FIG. 14 illustrates a spectroscopic device 100B according to the sixth embodiment. The spectroscopic device 100B according to this embodiment includes the spectrum measuring device 110, the light source 120, an upper-level controller 150, and a battery 160.

Upon reception of an operation on the spectroscopic device 100B, the upper-level controller 150 controls operations of the spectrum measuring device 110 and the light source 120. In addition, the upper-level controller 150 performs control to output spectrum characteristics that are output from the spectrum measuring device 110 to, for example, a user of the spectroscopic device 100B.

The battery 160 is a power source of the spectrum measuring device 110, the light source 120, the upper-level controller 150, and the like.

In the spectroscopic device 100B according to this embodiment, emitted light 121 is emitted from the light source 120, the measurement target 1 is irradiated with the emitted light 121, and the emitted light 121 is diffusely reflected while colliding with molecules in the measurement target 1. Diffusely reflected light 122 is incident on the spectrum measuring device 110 and is detected by the light detection element 137 provided in the spectrum measuring device 110. Thus, the spectroscopic device 100B according to this embodiment can obtain a wavelength spectrum that is characteristic to a molecule structure of the measurement target 1.

The present disclosure has been described above on the basis of the embodiments, but the present disclosure is not limited to the above embodiments. The embodiments may be modified without departing from the spirit of the present disclosure and may be determined appropriately in accordance with applications.

Note that the ribbon element 200 according to this embodiment is an example of a ribbon element according to Claims, each movable ribbon 250 is an example of a first light reflector, the movable reflection surfaces 252 are examples of first light reflection surfaces, each fixed ribbon 260 is an example of a second light reflector, and the fixed reflection surfaces 262 are examples of second light reflection surfaces.

In addition, the drive controller 141 according to this embodiment is an example of a drive controller according to Claims, the light detection element 137 is an example of a light detection element, the light quantity acquirer 142 is an example of a light quantity acquirer, and each of the piezoelectric bodies 231 and 241 is an example of a piezoelectric body.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. A spectrum measuring device comprising:
a ribbon element including
   a first light reflector including a plurality of first light reflection surfaces configured to be translated in an out-of-plane direction, and
   a second light reflector including a plurality of second light reflection surfaces that are stable;
a light detection element configured to detect, on a single light receiving surface, light quantity data indicating a light quantity of light reflected by the first light reflection surfaces and the second light reflection surfaces;
circuitry to:
supply a drive signal to the ribbon element in such a manner that a change of a displacement amount difference between the first light reflection surfaces and the second light reflection surfaces corresponds to a predetermined frequency; and
acquire the light quantity data detected by the light detection element at a predetermined sampling frequency.

2. The spectrum measuring device according to claim 1, wherein the predetermined frequency is equal to a frequency of the drive signal.

3. The spectrum measuring device according to claim 1, wherein the light detection element detects, of light reflected by the ribbon element, a component other than a component of incident light that is regularly reflected by the ribbon element.

4. The spectrum measuring device according to claim 1, wherein the first light reflector and the second light reflector are adjacent to each other in the ribbon element.

5. The spectrum measuring device according to claim 1, wherein, in a state in which the drive signal is not supplied to the ribbon element, the first light reflection surfaces and the second light reflection surfaces are at different locations in the out-of-plane direction.

6. The spectrum measuring device according to claim 1, wherein the circuitry further calculates, on the basis of a data stream of the light quantity data acquired, an intensity of light that is input to the ribbon element at each wavelength.

7. The spectrum measuring device according to claim 6, wherein the circuitry further calculates, at each time when the light quantity is acquired, an average of a plurality of light quantity data items detected by the light detection element around the timing, and
wherein the circuitry further calculates, on the basis of a data stream of the average of the light quantity data items, the intensity of light that is input to the ribbon element at each wavelength.

8. The spectrum measuring device according to claim 1, wherein the drive signal is a signal having a triangular waveform.

9. The spectrum measuring device according to claim 1, wherein the drive signal is a signal having a sinusoidal waveform.

10. The spectrum measuring device according to claim 8, wherein the ribbon element further includes a piezoelectric body formed in a vicinity of the first light reflector, and
wherein the circuitry supplies the drive signal to the piezoelectric body to change the displacement amount difference between the first light reflection surfaces and the second light reflection surfaces.

11. A spectroscopic device comprising:
the spectrum measuring device according to claim 1; and
a light source,
wherein a measurement target is irradiated with light from the light source, and light reflected by the measurement target is incident on the spectrum measuring device.

12. The spectroscopic device according to claim 11, wherein the circuitry further transmits the light quantity data acquired by the light detection element, to an external device.

13. A spectroscopic system comprising:
the spectrum measuring device of claim 1; and
an information processing apparatus to calculate, on the basis of a data stream of the light quantity data acquired by the light detection element, an intensity of light that is input to the ribbon element at each wavelength.

* * * * *